UNITED STATES PATENT OFFICE.

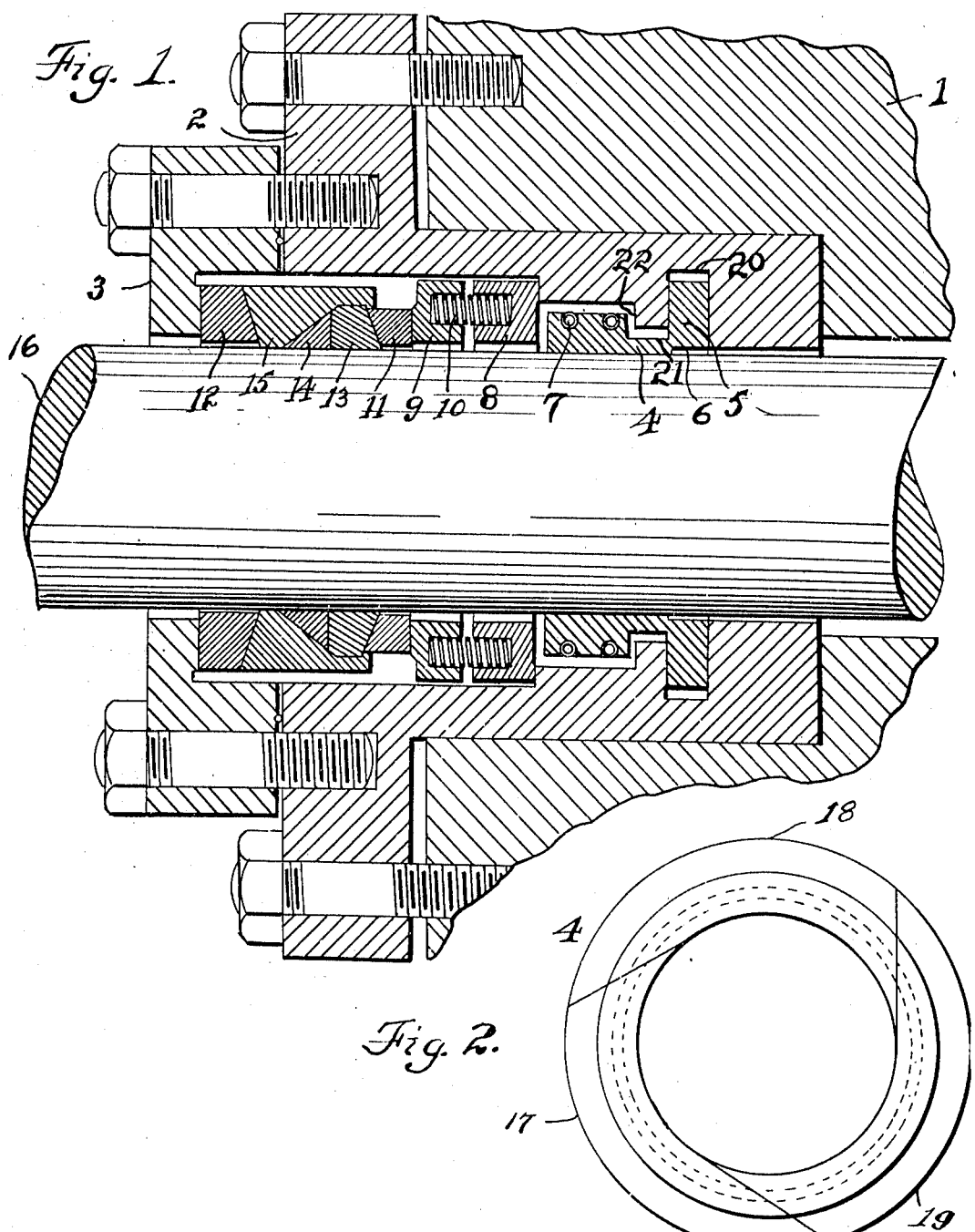

CHARLES LEE COOK, OF LOUISVILLE, KENTUCKY.

METALLIC PACKING.

1,066,711.  Specification of Letters Patent.  Patented July 8, 1913.

Application filed November 20, 1911. Serial No. 661,320.

*To all whom it may concern:*

Be it known that I, CHARLES LEE COOK, a citizen of the United States, and a resident of Louisville, in the county of Jefferson and State of Kentucky, have invented certain Improvements in Metallic Packing, of which the following is a full, clear, and exact description.

The object of the invention is to provide new and improved packing for the piston rods of explosion and other high pressure engines.

The invention consists of novel features, and parts and combinations of the same, which will be more fully described hereinafter and then pointed out in the claims.

A practical embodiment of the invention is represented in the accompanying drawings, forming a part of this specification, in which similar characters of reference indicate the corresponding parts in all the views.

Figure 1 is a vertical longitudinal section, showing the piston rod in elevation. Fig. 2 is an end elevation of the inner ring.

My invention consists in combining with the usual packing rings around the piston rod of an engine an inner protecting ring of novel structure, adapted to coöperate with the packing casing to protect the ordinary packing rings more efficiently from the force of the explosion or other high pressure, and also adapted to protect itself from said force or pressure.

The packing casing 2 is bolted to the stuffing box 1 and the gland 3 is bolted to the packing casing 2 in the usual manner. The usual compound packing ring, made up of the rings 13 and 14, is covered by the vibrating cup 15, supported on the outer side by the ball ring 12 and on the inner side by the follower 11, and held resiliently in position lengthwise of the piston rod 16 by the inner compound spring-holding ring, which is made up of the rings 8 and 9 held resiliently apart by the coil spring 10.

The inner protecting ring 4 is preferably cut tangentially in the usual manner, as shown in Fig. 2, into three parts, 17, 18, and 19. It is held against the rod by the usual springs 7. It is in the form of a sleeve with a flange 5 at its inner end. This flange 5 is of substantially greater annular thickness than the balance of the ring. It fits closely into the recess 20 of the packing casing 2, with a clearance between its outer periphery and the periphery of the recess. The purpose of this flange, fitting closely into the annular recess of the packing casing, is to make it very difficult for the exploding gas or other pressure to reach the balance of this inner ring and the other packing rings. The flange 5 is further provided with an annular recess 6, extending the larger part of its width. The purpose of this annular recess is to allow the force of the explosion or other pressure to act equally on the inner and outer peripheries of the flange 5 so that it will not force the ring 4 against the piston rod 16. The inner ring 4 is also provided with the annular groove 21, just outside the flange 5, to admit the annular partition 22 in the packing casing 2. This partition supports the outer flat surface of the flange 5 securely against the end thrust of the explosion or pressure.

I do not limit myself to the exact form in which my invention is disclosed herein further than is indicated in the claims which follow.

I claim:

1. In combination with the stuffing box and piston rod of an engine, a packing casing, an outer packing ring, and an inner combined packing and protecting ring; said inner ring comprising means for self-compression against the rod and being in the form of a sleeve provided at its inner end with a flange of substantially increased annular thickness; said casing being provided with an annular recess adapted to receive said flange and to support it closely on each of its flat surfaces.

2. In combination with the stuffing box and piston rod of an engine, a packing casing, an outer packing ring positioned therein, and an inner protecting ring; said inner ring being in the form of a sleeve provided at its inner end with a flange whose outer diameter is substantially greater than the outer diameter of the sleeve and whose inner diameter is slightly larger than the inner diameter of the sleeve; said casing being provided with an annular recess of greater diameter than said flange and being adapted to support said flange closely on each of its flat surfaces.

3. In combination with the stuffing box and piston rod of an engine, a packing casing, an outer packing ring positioned therein, and an inner protecting ring; said casing being provided with an annular recess and an annular partition; said protecting ring being provided with an annular recess adapted to receive said partition and with a flange whose outer diameter is substantially greater than the outer diameter of the sleeve, adapted to fit in the said annular recess in said casing and to bear tightly against the outer flat surface thereof.

CHARLES LEE COOK.

Witnesses:
 EVELYN WILLIAMS,
 WILLIAM J. P. SCHOEFFLEN.

Copies of this patent may be obtained for five cents each, by addressing the "Commissioner of Patents, Washington, D. C."